US009611106B2

(12) United States Patent
    Tell

(10) Patent No.: US 9,611,106 B2
(45) Date of Patent: Apr. 4, 2017

(54) DEVICE AND SYSTEM FOR PNEUMATIC TRANSPORT OF MATERIAL

(71) Applicant: Xerex AB, Taby (SE)

(72) Inventor: Peter Tell, Akersberga (SE)

(73) Assignee: Xerex AB, Taby (SE)

( * ) Notice: Subject to any disclaimer, the term of this patent is extended or adjusted under 35 U.S.C. 154(b) by 0 days.

(21) Appl. No.: 15/169,839

(22) Filed: Jun. 1, 2016

(65) Prior Publication Data

US 2016/0347557 A1    Dec. 1, 2016

(30) Foreign Application Priority Data

Jun. 1, 2015   (EP) .................................. 15170099

(51) Int. Cl.
   *B65G 53/28*    (2006.01)
   *B65G 53/66*    (2006.01)
   *B65G 53/24*    (2006.01)

(52) U.S. Cl.
   CPC ............ *B65G 53/66* (2013.01); *B65G 53/24* (2013.01); *B65G 2203/025* (2013.01)

(58) Field of Classification Search
   CPC ..................................................... B65G 53/28
   USPC .................................. 406/14, 144, 151, 168
   See application file for complete search history.

(56) References Cited

U.S. PATENT DOCUMENTS

| 5,224,802 | A | * | 7/1993 | Federhen | ............. | B65G 53/525 |
| | | | | | | 406/11 |
| 5,702,209 | A | * | 12/1997 | Mauchle | ............... | B05B 12/085 |
| | | | | | | 406/12 |
| 5,819,373 | A | * | 10/1998 | Schlichter | ............... | B07C 5/342 |
| | | | | | | 19/0.21 |
| 6,386,800 | B1 | * | 5/2002 | van Eyck | ............... | B65G 53/66 |
| | | | | | | 406/14 |

(Continued)

FOREIGN PATENT DOCUMENTS

DE    10 2008 034929 A1    2/2010
EP         2 003 075 A1   12/2008

(Continued)

OTHER PUBLICATIONS

Extended European Search Report for corresponding European Patent Application No. 15170099.4 dated Oct. 21, 2015.

*Primary Examiner* — Joseph Dillon, Jr.
(74) *Attorney, Agent, or Firm* — Renner, Otto, Boisselle & Sklar, LLP

(57) ABSTRACT

A pneumatic transport device (1a, 1b) for transporting a pneumatically transportable material (M) in a pneumatic system (10) by means of air for transporting the pneumatic transportable material (M) between a first pneumatic system portion (11) and a second pneumatic system portion (12), the pneumatic system portions (11, 12) including a plurality of pneumatic tubes (13) forming a continuous pneumatic transport path (CL), the device (1a, 1b) including an air source (2a, 2b), typically a vacuum source (2a), pneumatically connected to one of the first or second pneumatic system (Continued)

portions (11, 12) operative to provide air pressure or vacuum through the continuous pneumatic transport path (CL), and a controller (4a, 4b) configured to control the speed of the vacuum source (2a) and/or a mass-flow, respectively, of the material (M) in dependence of input from a monitoring line (3) adapted to monitor the pneumatic transport path (CL) to provide essentially constant speed of transport the pneumatically transportable material (M).

9 Claims, 4 Drawing Sheets

(56) References Cited

U.S. PATENT DOCUMENTS

| | | | | |
|---|---|---|---|---|
| 6,394,708 B1* | 5/2002 | Braden | ............... | B65G 53/60 |
| | | | | 406/173 |
| 6,447,215 B1* | 9/2002 | Wellmar | ............... | B65G 53/66 |
| | | | | 406/11 |
| 6,588,988 B2* | 7/2003 | Zlotos | ............... | B65G 53/66 |
| | | | | 406/14 |
| 6,786,681 B2* | 9/2004 | Grasshoff | ............... | B65G 53/521 |
| | | | | 406/11 |
| 6,935,813 B2* | 8/2005 | Van Dorst | ............... | B65G 53/66 |
| | | | | 137/114 |
| 6,994,497 B1* | 2/2006 | Eriksson | ............... | B01J 8/0005 |
| | | | | 406/124 |
| 7,066,689 B2* | 6/2006 | Maguire | ............... | B65G 53/24 |
| | | | | 406/163 |
| 7,192,222 B2* | 3/2007 | Van Mullekom | .... | B65G 53/521 |
| | | | | 406/151 |
| 7,228,990 B2* | 6/2007 | Schmidt | ............... | B28C 5/40 |
| | | | | 141/83 |
| 7,850,047 B2* | 12/2010 | Boroch | ............... | B65G 53/16 |
| | | | | 222/181.2 |
| 7,891,954 B2* | 2/2011 | Sundholm | ............... | B01D 47/06 |
| | | | | 406/153 |
| 7,972,087 B2* | 7/2011 | Davison | ............... | A22C 21/0053 |
| | | | | 222/410 |
| 8,113,745 B2* | 2/2012 | Aoki | ............... | B65G 53/525 |
| | | | | 406/126 |
| 8,317,194 B2* | 11/2012 | Werner | ............... | B65H 5/228 |
| | | | | 271/264 |
| 8,491,228 B2* | 7/2013 | Snowdon | ............... | B01J 8/0025 |
| | | | | 406/14 |
| 8,528,717 B2* | 9/2013 | Ando | ............... | B41F 17/005 |
| | | | | 198/306 |
| 8,747,029 B2* | 6/2014 | Thorn | ............... | B65G 53/66 |
| | | | | 406/127 |
| 8,905,681 B2* | 12/2014 | Schneider | ............... | B65G 53/06 |
| | | | | 209/139.1 |
| 9,086,164 B2* | 7/2015 | Mortzheim | ............... | F16K 24/00 |
| 9,181,044 B1* | 11/2015 | Baker | ............... | B65G 51/00 |
| 9,365,367 B2* | 6/2016 | Kraemer | ............... | B65G 53/06 |
| 2005/0089378 A1 | 4/2005 | Gerber | | |
| 2008/0314461 A1* | 12/2008 | Moretto | ............... | B65G 53/66 |
| | | | | 137/571 |

FOREIGN PATENT DOCUMENTS

| | | |
|---|---|---|
| EP | 2 799 375 A1 | 11/2014 |
| EP | 2 808 278 A1 | 12/2014 |
| FR | 676 393 A | 2/1930 |
| FR | 2 812 864 A1 | 2/2002 |
| GB | 999 635 A | 7/1965 |
| JP | S59 7623 A | 1/1984 |
| NL | 1 004 437 C2 | 5/1998 |
| WO | 2010/053485 A1 | 5/2010 |

* cited by examiner

DEVICE AND SYSTEM FOR PNEUMATIC TRANSPORT OF MATERIAL

This application claims priority of European Application No. 15170099.4 filed Jun. 1, 2015, which is hereby incorporated herein by reference.

FIELD

The present disclosure relates generally to pneumatic transport systems. More specifically, the disclosure provides transport devices for transporting material in a pneumatic transport system and a system comprising such transport devices.

BACKGROUND

Pneumatic transport systems are well-known for the transport of pneumatic transportable material between, for example, a first origin location and a second destination location in a plurality of interconnected tubes. A typical pneumatic transport system includes a number of pneumatic tubes interconnected to a conveying line such as a pipe-line to transport pneumatically transportable material therein. Various pneumatic transport devices, at the first location, the origin and/or the second location, the destination, provide a force affecting a fluid, such as air, flowing in the pipe-line for transport of the pneumatic transportable material within the pipeline. Thus, the pneumatic transport system transports material under fluid pressure or vacuum. Often vacuum is used in these pneumatic transport systems and they are therefore sometimes simply referred to as "vacuum conveying technology".

The pneumatic tubes forming the conveying line of the pneumatic tube transport system for instance using vacuum conveying technology may be arranged in any manner that allows the material to be transported between various locations including straight tubes but also bent tubes. It will be appreciated that the distances between origin and destination locations in the pipeline may be quite large and that a material transport speed may be quite high within the pipe-line.

The pneumatic transport systems are also typically required to handle a large variety of products from bridging to free flowing powder.

Typical applications of pneumatic transport systems, in particular conveyor lines, using vacuum technology, i. e. vacuum conveying technology are food and pharmaceutical industries, requiring "robustness" among other requirements.

By the term "robustness" is meant herein that the pneumatic transport system has to be able to transport the material at a reasonable high speed without destroying the material, which is often fragile and may be damaged during transport. For instance, if the speed of transport of the material is high, or "too" high, and the material hits a tube bend, or parts of the material collides with itself, for instance tablets colliding with each other during transport within the pipe-line, the material may be destroyed. Thus, a "too" high speed of transport, such that material is destroyed is not desirable.

If "too" much material is feed into the pneumatic tube transport system, as regards transport capacity of that particular pneumatic transport system and the properties of the material to be transported, the speed of transport of material will decrease, and thereby also transport capacity.

There are also other problems with too high speed of transport resulting in unnecessary high wear of tubes or other components used in the transport system.

There are also problems with expensive electronic control systems requiring expensive types of sensors, such as speed detection sensors. An example of a system using speed detection sensors is disclosed in EP 2 003 075 A1. The sensors are located in the transport path.

Until now, none of these problems related to pneumatic tube transport systems have been fully addressed according to our knowledge.

SUMMARY

Provided herein is a pneumatic transport device and a system comprising at least one such transport device for improving transporting a pneumatic transportable material in a pneumatic system by means of a fluid such as air for transporting the pneumatic transportable material such as tablets, powder etc. from a first pneumatic system portion, i. e. an origin, to a second pneumatic system portion, i. e. to a destination, via a plurality of pneumatic tubes forming a pneumatic transport path. The device and system permit the pneumatic transportable material to be transported at essentially constant speed. Herein, the term "essentially constant speed" means±20% variation of speed still regarded as "constant speed". In this regard, air pressure or vacuum is controlled by the pneumatic transport device(s) to effectuate the essentially constant flow. The ability to utilize essentially constant speed of pneumatic transportable material provides reduced acceleration and/or retardation of the pneumatic transportable material, which is a great advantage.

According to a first aspect, there is provided a pneumatic transport device for transporting a pneumatic transportable material in a pneumatic system by means of a fluid, such as air, nitrogen etc., for transporting the pneumatic transportable material between a first pneumatic system portion and a second pneumatic system portion, for instance from a first pneumatic system location, an origin to a second pneumatic system location, a destination. Herein, the term "first portion" includes an origin location and the term "second portion" includes a destination location.

The pneumatic system portions comprise a plurality of pneumatic tubes forming a continuous pneumatic transport path. The pneumatic transport device comprises a pneumatic fluid source, such as an air source, pneumatically connected to one of the first or second pneumatic system portions operative to provide fluid pressure, such as positive air pressure (referred to as "air pressure") or negative air pressure, vacuum, through the continuous pneumatic transport path. A speed controller is configured to control the speed of the air source and/or a mass-flow respectively, of the material in dependence of input from one or more monitoring line(s) adapted to monitor the pneumatic transport path to provide essentially constant speed of transporting the pneumatic transportable material.

A system pressure sensor is connected to the monitoring line(s), wherein the pressure sensor is configured to generate a sensor signal indicating system pressure in the monitoring line(s) and hence in the conveying line having the same system pressure. The monitoring line is typically arranged in parallel to the conveying line. The speed controller is configured to control the speed of the air source and/or a mass-flow respectively, of the material in dependence of input from the pressure sensor(s) in the monitoring line(s).

In this way, an easy and inexpensive control of the speed of the air source and/or a mass-flow respectively is provided, in contrast to complicated electronic control as in prior art systems. This also avoids the use of a typically expensive speed-sensor, since only a pressure sensor is required. Also problems related to having a sensor located in the conveying line is avoided, since the sensor is located in one or more monitoring line(s). The sensor might for instance be sensitive to wear, which might be a considerable problem when the sensor is located in the conveying line, and if the sensor is a sensitive speed-sensor.

Herein this disclosure, the term "pneumatic transport device" includes at least one of the following: fluid driven ejector-pump, electric vacuum pump, vacuum conveyor, feed-hopper provided with mass-flow control.

Herein this disclosure, the term "pneumatic transportable material" any material that can be transported by means of a fluid such as air, including bridging to free flowing powder.

Herein this disclosure, the term "fluid" includes air, nitrogen, but is not limited to these fluids. If nitrogen is used, the feed-hopper includes a lid.

Herein this disclosure, the term "fluid source" is a, comprised in or connected to an ejector-pump, electric vacuum pump and feed-hopper but is not limited to these and if the fluid is air, the source is referred to as an "air-source".

The controller(s) generate(s) control signals that allow for essentially constant speed of transporting the pneumatic transportable material by means of controlling the speed of the pneumatic transport device, and/or mass-flow of the material in the pneumatic transport path. In this way, an essentially constant speed of transport of material can be obtained. This has a number of advantages in addition to the ones described above including decreased power consumption, reduced wear of components used in the system, reduced noise, reduced wear of material, increased flow of pneumatically transportable material.

In another aspect, there is provided a pneumatic transport device according to the first aspect, wherein the air source is a pneumatic pump adapted to provide vacuum through said continuous pneumatic transport path for the air, the pressure monitoring line is coupled between the pump and the controller is configured to generate control signals via a feed-back line to the pump.

In another aspect, there is provided a pneumatic transport device according to the first aspect, wherein the air-source is an electric driven frequency-controlled vacuum pump and the controller is configured to generate control signals having different frequencies.

According to another aspect, there is provided a system comprising at least one pneumatic control device.

BRIEF DESCRIPTION OF THE DRAWINGS

For a more complete understanding of the present disclosure and further advantages thereof, reference is now made to the following detailed description taken in conjunction with the drawings in which.

DETAILED DESCRIPTION

Reference will now be made to the accompanying drawings, which are intended to at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
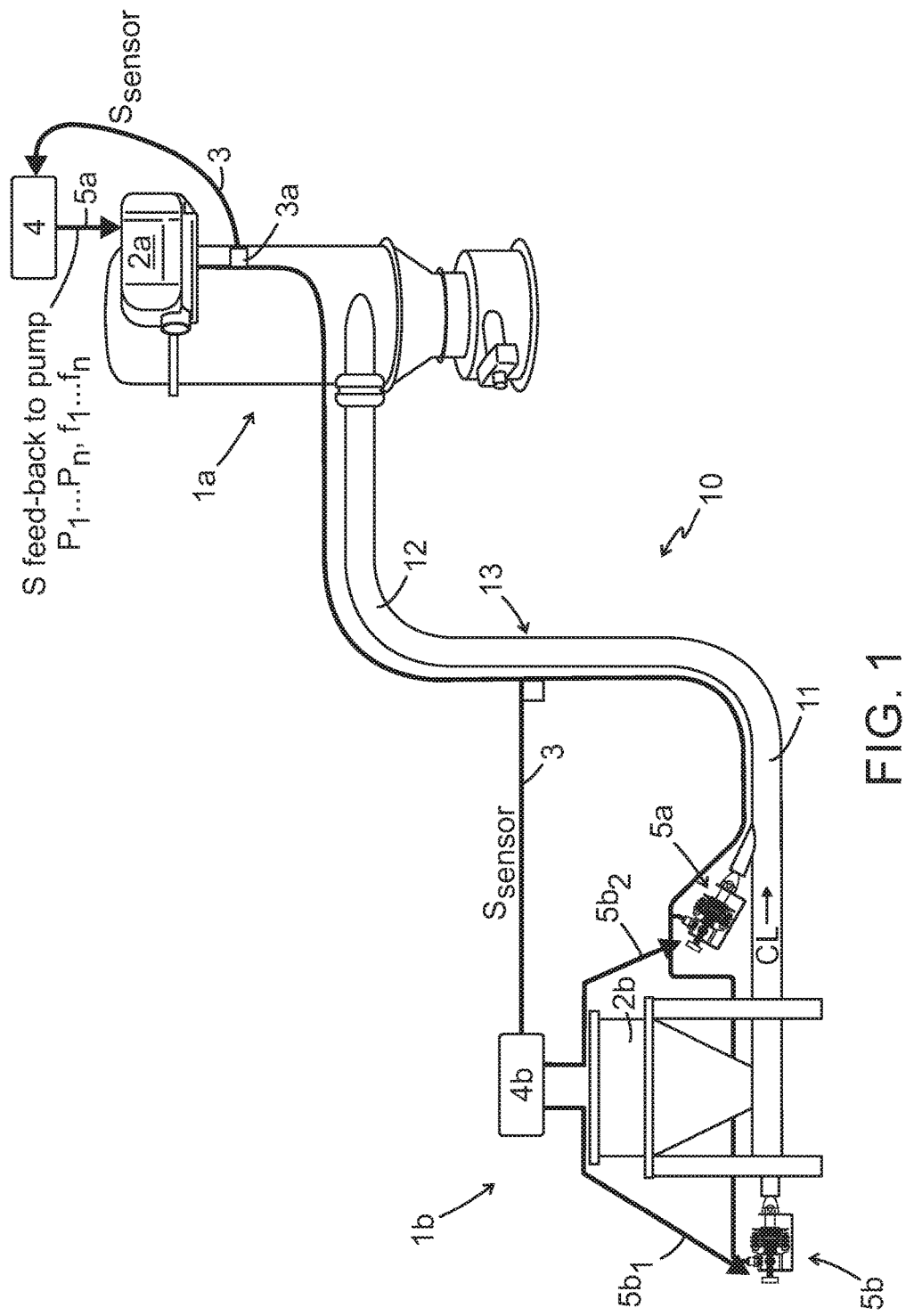
FIG. 1 illustrates one embodiment of a pneumatic transport system according to the invention, comprising two pneumatic transport devices.

Now is referred to FIG. 1, which illustrates one embodiment of a pneumatic transport system 10 according to the invention. The pneumatic transport system 10 comprises at least one, herein two, pneumatic transport devices 1a, 1b for transporting a pneumatic transportable material M (not shown) in the pneumatic system 10 by means of a fluid, such as compressed air, herein vacuum, for transporting the pneumatic transportable material M between (typically from) a first pneumatic system portion 11 and a second pneumatic system portion 12 (see dividing line intended to schematically illustrate the pneumatic system portions 11, 12). The pneumatic system portions 11, 12 comprise a plurality of interconnected pneumatic tubes 13 (which may as an example, but not limited there to, be circular in cross-section), the tubes 13 being made of stainless-steel for instance, or any other suitable material depending on application, forming a continuous pneumatic transport path CL, sometimes also referred to as a conveying line, for transporting the pneumatic transportable material M. The pneumatic system 10 according to this embodiment comprises two pneumatic transport devices 1a, 1 b, herein a first pneumatic transport device 1 connected at the second pneumatic system portion 12 and a second pneumatic transport device 1b connected at the first pneumatic system portion 11. According to other embodiments, which are not shown in this drawing figure, only one pneumatic transport device 1a, 1b may be comprised in the transport system 10.

The pneumatic transport devices 1a, 1 b, at the first location, the origin 1b and/or the second location, the destination 1a, provide a force (see direction of flow in conveying line CL illustrated by an arrow) affecting a fluid, such as air, flowing in the pipes 13 for transport of the pneumatic transportable material M within the pipes. Thus, the pneumatic transport system transports material M under fluid pressure or vacuum. Herein, vacuum is provided by the first pneumatic transport device 1a.

Each of the pneumatic transport devices 1a, 1b comprises, or is configured to communicate with, a respective controller 4a, 4b, respectively (controller 4a, 4b) configured to control the speed of an air source 2a comprised in the first pneumatic transport device 1a, and operative at adjustable supply pressures or at different adjustable supply frequencies, and/or a mass-flow (air source 2b being a feed-hopper and comprised in the second transport device 1b), respectively, of the material M in dependence of input from a respective, or combined, monitoring line 3, configured to monitor (at one or more suitable location(s) of the conveying line CL) the pneumatic transport path CL to provide essentially constant speed of transport the pneumatic transportable material M. How the essentially constant speed will be obtained is further explained below.

Typically, a system (vacuum) pressure sensor 3a is connected to the monitoring line(s) 3, wherein said vacuum pressure sensor 3a generates a sensor signal $S_{sensor}$ indicating system vacuum pressure (illustrated in FIG. 4) in said monitoring line(s) 3 and hence conveying line CL (having the same system pressure).

Figure 2:
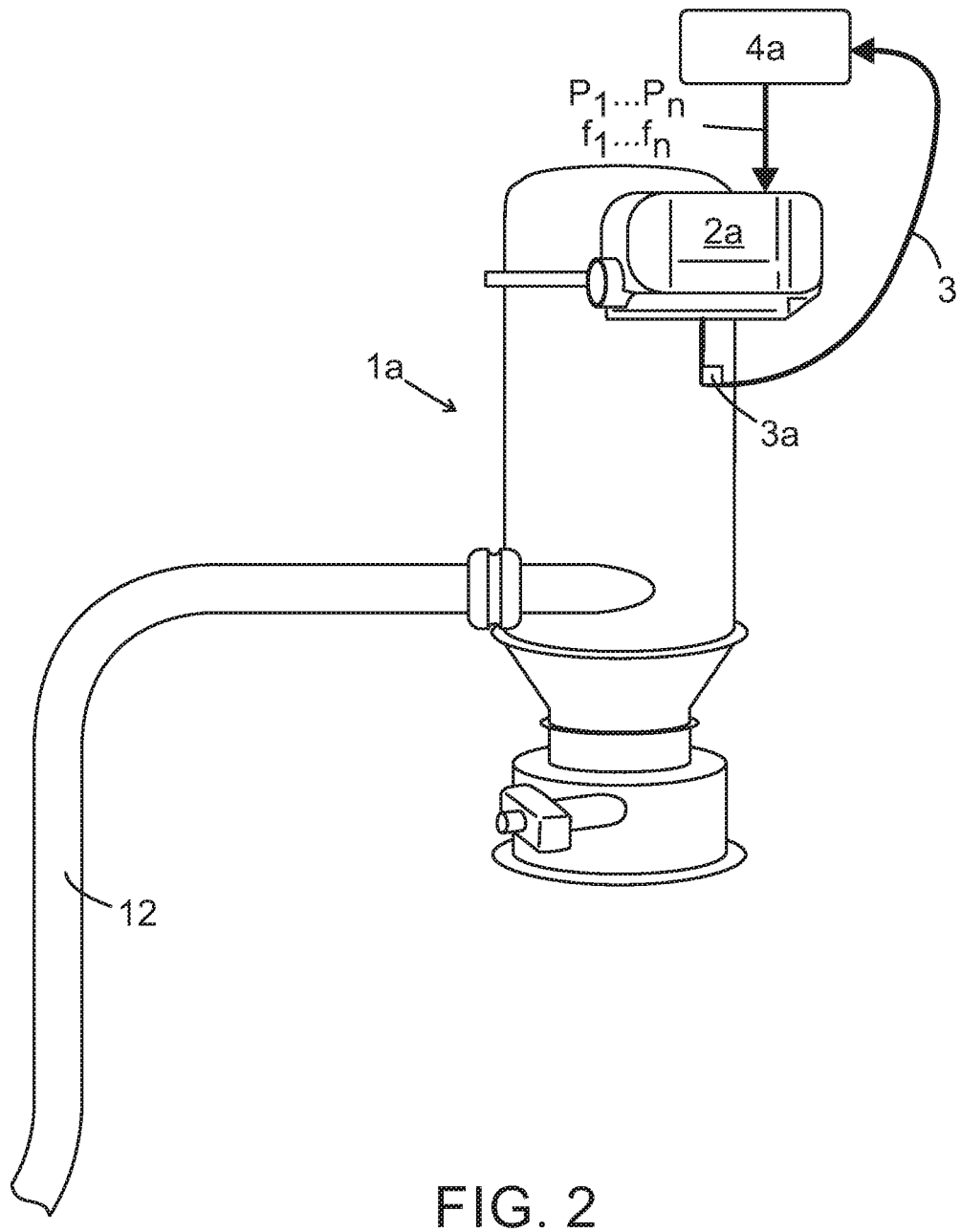
FIG. 2 illustrates a first embodiment of one pneumatic transport device for use in a pneumatic transport system according to the invention.

Now is referred also to FIG. 2.

The first pneumatic transport device 1a, according to this embodiment including a so-called "vacuum conveyor", in this embodiment also referred to the same, comprises an air source 2a pneumatically connected to the second pneumatic system portion 11 (even though it could be connected to the first pneumatic system portion instead) and is operative to provide vacuum, herein by means of a fluid driven ejector-vacuum pump operative at adjustable supply pressures or an electric driven vacuum-pump operative at different adjustable supply frequencies, through the continuous pneumatic transport path CL, i. e. the conveying line. The adjustable supply pressures (if air-source 2a is embodied as a fluid-driven ejector pump) or the adjustable supply frequencies (if air-source 2a is embodied as electric driven vacuum pump) are controllable by means of the controller 4a in dependence of input $S_{sensor}$ from the monitoring line 3 comprising a sensor 3a able to sense system pressure (vacuum) and/or flow (vacuum) at one or more suitable location(s) of the conveying line CL (herein schematically shown to intended to illustrate the various possible arrangements of the sensor(s) 3a).

The vacuum conveyor 1a can be a conventional vacuum conveyor unit, for instance manufactured and sold by Piab A B, Sweden.

Figure 3:
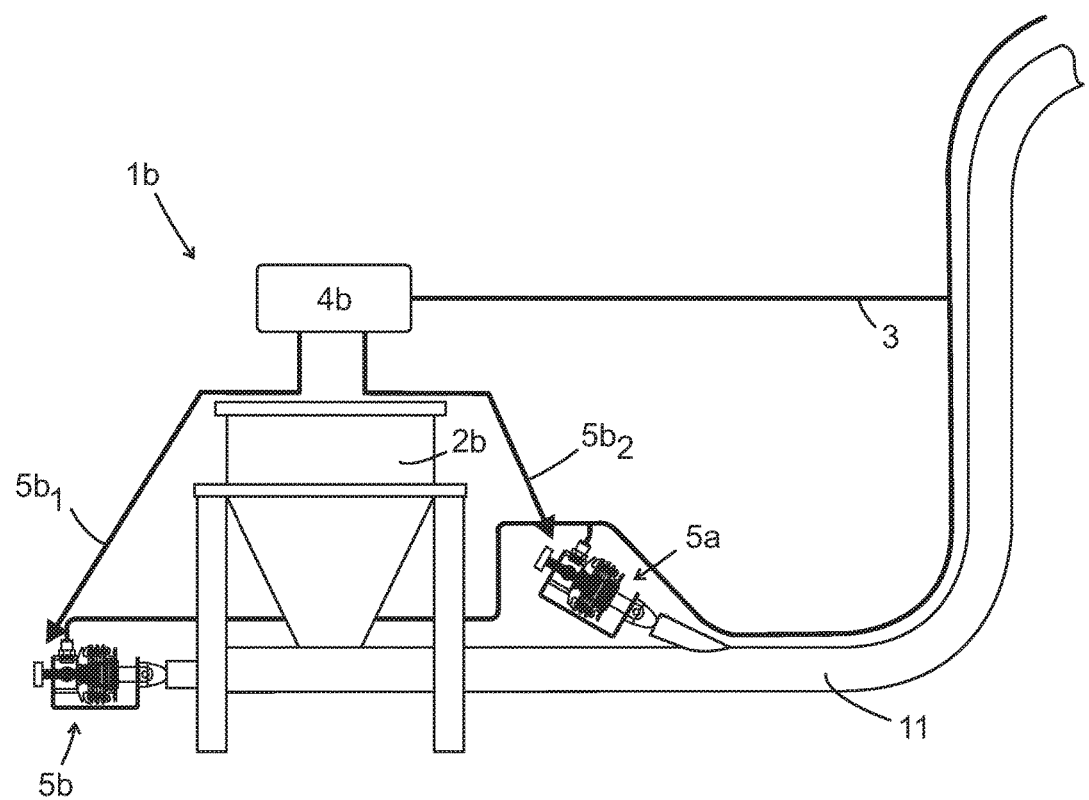
FIG. 3 illustrates a second embodiment of one pneumatic transport device for use in a pneumatic transport system according to the invention.

Now is also referred to FIG. 3, which illustrates a second embodiment of a pneumatic transport device for use in a pneumatic transport system according to the invention.

The second pneumatic transport device 1b can comprise a so-called "feed-hopper" 2b, which is also adapted to feed new material into the system 10. This is not further explained since a feed-hopper 2b per se is well known for the skilled person of vacuum transport systems. The second pneumatic transport device 1b comprises or is configured to and can communicate with controllable actuators $5b_1$, $5b_2$, which are adapted to be adjusted in control of the controller 4b and arranged for diluting a mass-flow MF of the material in the conveying line CL, for instance to prevent choking the conveying line CL with transport material. The controllable actuators $5b_1$, $5b_2$ can be electronically adjusted for instance being a so-called "proportional actuator" and configured to control one or more vents 5a, 5b in fluid connection with the conveying line, the vents 5a, 5b, typically embodied as valves, may be separate or combined with the actuators $5b_1$, $5b_2$. The vents 5a, 5b may alternatively be controlled directly by vacuum without the actuators $5b_1$, $5b_2$. The vents 5a, 5b are adapted to either vent positive pressure to atmosphere or provide ambient air (if embodied as a vacuum system as shown and explained in relation to this particular embodiment). The present embodiment utilizes at least one pressure/vacuum relive valve 5a, 5b fluidly connected to the tube 13 and hence conveying line. This at least one valve 5a, 5b allows for venting the tube 13 to atmosphere to either exhaust pressure or provide ambient air and is adapted to be controlled. By the controllable actuators $5b_1$, $5b_2$ and controlled by the controller 4b and arranged for diluting, the mass-flow MF of the material in the conveying line CL.

An advantage with this embodiment is that it solves the problem with too much material being feed into the pneumatic transport system via the feed-hopper 2b, as regards transport capacity of that particular pneumatic transport system and material to be transported, such that the speed of transport of material will not decrease, and thereby transport capacity, i. e. to avoid to clogging of material M in the pipes 13.

If nitrogen is used, the feed-hopper 2b includes a lid.

The controllers 4a, 4b, which may alternatively be combined in a single unit (not shown), respectively, may include a digital processor and memory. The controllers 4a, 4b may be configured as one or more programmable digital computers. Connectable to the controllers 4a, 4b may be one or more user interfaces (not shown) through which a system user (not shown) may monitor the operations of the system 10 and/or manually enter one or more commands to control its operation. Each of the controllers 4a, 4b described above in relation to FIG. 1 may include one or more electrical and/or electro-mechanical components which provide for the physical movement of a component such as a valve within the system 10.

System Operation

Figure 4:
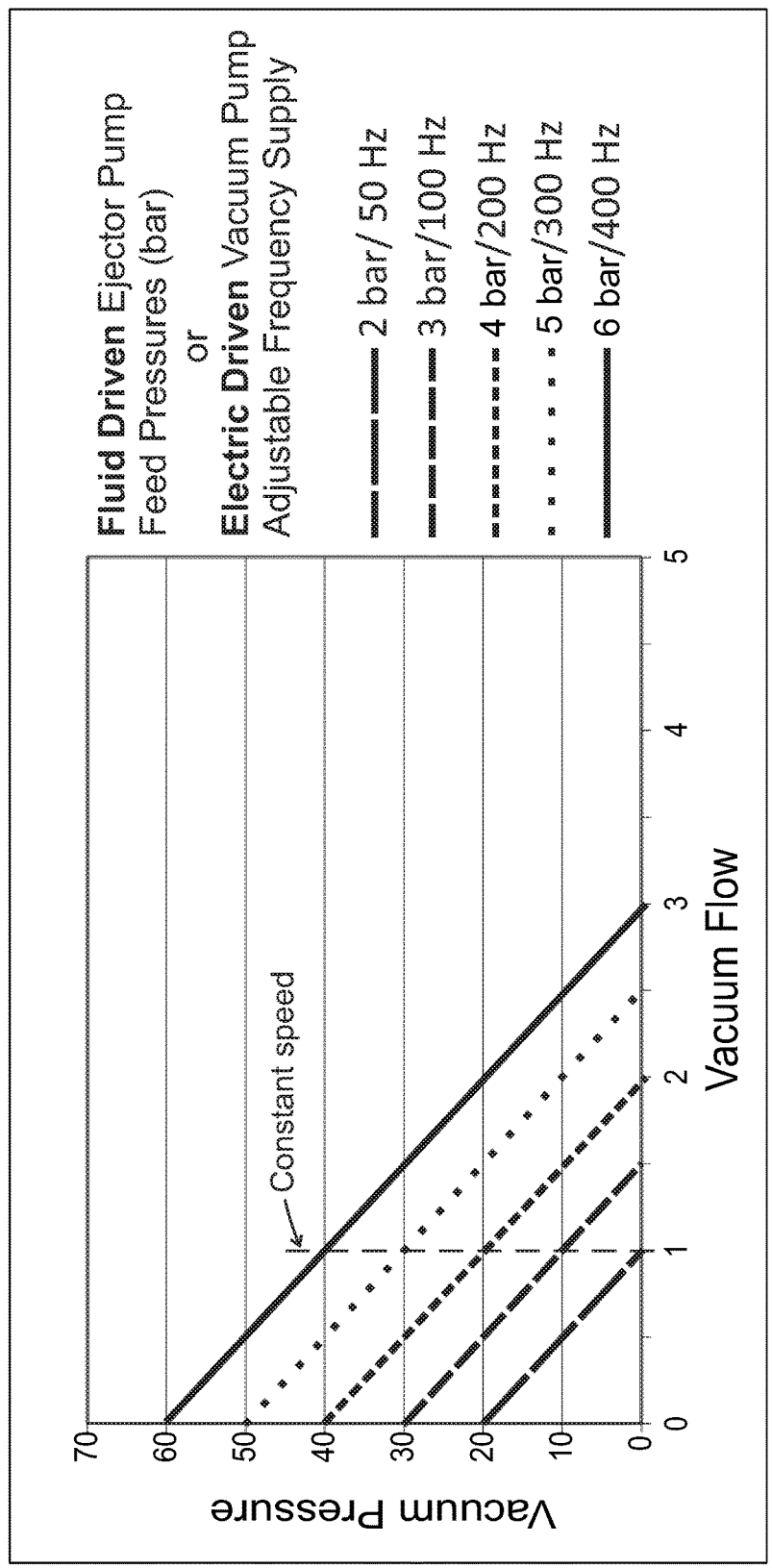
FIG. 4 illustrates a graph of vacuum system pressure vs. vacuum flow at different pressures of ejector pump or frequencies of electric vacuum pump supply.

Now is also referred to FIG. 4, which illustrates a graph of vacuum system pressure vs. vacuum flow at different pressures of ejector pump or frequencies of electric vacuum pump supply.

As explained in relation to FIGS. 1, and 2, the pressure monitoring line 3 is according to one embodiment connected between the air-source 2a, herein embodied as a vacuum pump, and the controller 4a, wherein the controller 4a is configured to generate control signals via the feed-back 5a line and configured to control the speed of the air-source 2a, herein pump, comprised in the first pneumatic transport device 1a, which air source 2a is operative at adjustable supply pressures 2, 3, 4, 5 or 6 bar as an example (wherein the adjustable supply pressures are shown by different lines in FIG. 4 or at different adjustable supply frequencies, 50, 100, 200, 300 or 400 Hz in dependence of input from the monitoring line 3a by means of the controller 4a being configured to generate feed control signals $S_{feedback\ to\ pump}$ of different pressures $P_1 \ldots P_n$, wherein $P_1$ is 2 bar, $P_2$, 3 bar etc. as exemplified via the feed-back signal line 5a, or feed control signals $S_{feedback\ to\ pump}$ of different frequencies $f_1 \ldots f_n$, wherein $f_1$ is 50 Hz, $f_2$ is 100 Hz and so on as exemplified above. The controller 4a controls the supply (feed) pressure to the air source 2a or frequency (depending on type of air source) such that an essentially constant speed (of the material that is transported) as shown by the vertical line "constant speed" in FIG. 4 is always obtained irrespectively of system vacuum pressure (illustrated as % vacuum) and vacuum flow (illustrated as normal m³/minute). As already explained, the term "essentially constant speed" means±20% variation of speed still regarded as "constant speed".

In this way, the transport device and system permit the pneumatic transportable material to be transported at essentially constant speed. In this regard, air pressure or vacuum is controlled by the pneumatic transport device to effectuate an essentially constant speed of material. The ability to utilize essentially constant speed of pneumatic transportable material provides reduced acceleration and/or retardation of the pneumatic transportable material.

An advantage of the device and system according to the embodiments described is that they provide a robust transport, i. e. the pneumatic transport system is able to transport the material at a reasonable essentially constant high speed without destroying the material, which is often fragile and may be damaged during transport. This solution has not been disclosed until now, despite a long felt need and problems with damaged material.

Another advantage is that the pneumatic device and transport system according to the embodiments can handle a large variety of products from bridging to free flowing powder in a robust way. Typical applications of the inventive pneumatic transport systems are food and pharmaceutical industries, requiring "robustness" among other requirements.

Another advantage is that also problems with too high speed of transport resulting in unnecessary high wear of tubes or other components used in the transport system are avoided or at least reduced by means of the inventive device and system.

Further advantages are: lower power consumption due to less accelerations of material required.

Since the material is transported at essentially constant speed it will provide less wear to material as well as equipment.

Another advantage is that noise will typically be reduced.

It will be appreciated that in most pneumatic tube transport systems pumps operate continuously. That is, rather than starting the pump each time a transport is initiated, the pump runs continuously and air pressure is vented to atmosphere if not needed. Due to the continuous pneumatic path created by the continuous operation of the pump, a vent may be required to either vent positive pressure to atmosphere or provide ambient air (if embodied as a vacuum system). The vents 5a, 5b described and shown in relation to the embodiment in FIGS. 1 and 3 can be used.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain modes known of practicing the inventions and to enable others skilled in the art to utilize the inventions in such or other embodiments and with various modifications required by the particular application(s) or use(s) of the presented inventions.

The invention claimed is:

1. A pneumatic transport device for transporting a pneumatically transportable material in a pneumatic system by means of air for transporting the pneumatically transportable material between a first pneumatic system portion and a second pneumatic system portion, said pneumatic system portions comprising at least one pneumatic tube forming a continuous pneumatic transport path, said device comprising:
   an air source pneumatically connected to one of said first or said second pneumatic system portions operative to provide air pressure or vacuum through said continuous pneumatic transport path,
   a monitoring line arranged in parallel to the conveying line, and
   a controller configured to control the speed of the air source and/or a mass-flow, respectively, of the material in dependence on an input from a monitoring line adapted to monitor the pneumatic transport path to provide essentially constant speed of transport of the pneumatically transportable material by means of at least one pressure sensor system pressure in the monitoring line and hence in the conveying line, as the monitoring line is arranged in parallel to the conveying line.

2. The pneumatic transport device according to claim 1, wherein the air source is a pneumatic pump adapted to provide vacuum through said continuous pneumatic transport path for the air, the pressure monitoring line is connected between the pump and an opposite end of the continuous pneumatic transport path, and the controller is configured to generate control signals via a feed-back line to the pump.

3. The pneumatic transport device according to claim 2, wherein the pump is a fluid driven ejector pump and the controller is configured to generate feed control signals of different pressures.

4. The pneumatic transport device according to claim 1, wherein the pump is an electrically driven frequency-controlled vacuum pump and the controller is configured to generate control signals having different frequencies.

5. The pneumatic transport device of claim 1, wherein at least one vent is operative to selectively vent air-pressure originating from said air source or to provide atmospheric air to said air source.

6. The device of claim 1, comprising:
   a system vacuum pressure first sensor connected to said monitoring line, wherein said vacuum pressure sensor generates a sensor signal indicating system vacuum pressure in said monitoring line and transport path.

7. The device according to claim 5, wherein the controller is configured to operate said at least one vent in response to said signal from a second flow sensor.

8. The device according to claim 5, wherein the at least one of the vent comprises a proportional actuator (vacuum).

9. A pneumatic transport system, comprising:
   at least one pneumatic transport device for transporting a pneumatically transportable material in the pneumatic transport system by means of air for transporting the pneumatically transportable material between a first pneumatic system portion and a second pneumatic system portion, said pneumatic system portions comprising at least one pneumatic tube forming a continuous pneumatic transport path, said device comprising:
   an air source pneumatically connected to one of said first or said second pneumatic system portions operative to provide air pressure or vacuum through said continuous pneumatic transport path,
   a monitoring line arranged in parallel to the conveying line, and
   a controller configured to control the speed of the air source and/or a mass-flow, respectively, of the material in dependence on an input from a monitoring line adapted to monitor the pneumatic transport path to provide essentially constant speed of transport of the pneumatically transportable material by means of at least one pressure sensor indicating system pressure in the monitoring line and hence in the conveying line, as the monitoring line is arranged in parallel to the conveying line.

* * * * *